J. Mc. Leish.
Corn Harvester.

N° 95,031.  Patented Sept. 21, 1869.

Witnesses
A. W. Almquist
O. Hinchman

Inventor
J. McLeish
per Munn & Co.
Attorneys.

United States Patent Office.

JOHN McLEISH, OF CHICAGO, ILLINOIS.

*Letters Patent No. 95,031, dated September 21, 1869.*

IMPROVEMENT IN CORN-HARVESTERS.

The Schedule referred to in these Letters Patent and making part of the same.

*To all whom it may concern:*

Be it known that I, JOHN McLEISH, of the city of Chicago, in the county of Cook, and State of Illinois, have invented a new and useful Improvement in Corn-Harvesters; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

My invention has for its object to furnish a simple, convenient, and effective machine, by means of which the corn-stalks may be cut, the ears separated from the stalks and deposited in a suitable receptacle, and the stalks deposited in bundles or bunches upon the ground; and It consists in the construction and combination of various parts of the machine, as hereinafter more fully described.

A is the frame of the machine, which is securely attached in the rear of its middle part, to the axle B of the wheels C.

The forward end of the frame A is pivoted, by means of a king-bolt, to the axle D, upon which work the small wheels E, so that the forward end of the machine may be close to the ground.

F are the lifters, which are attached to the forward end of the frame A, and which project downward and forward, so as to pass beneath inclined stalks of corn upon both sides of the row, and raise them. The rear parts of the lifters incline upward, inward, and rearward, so as to raise the inclined stalks into an erect position, and guide all the stalks into such a position that they may readily pass into the device, by which they are grasped and held while being cut.

G are the cutters, which are made similar to, and are operated from the driving-machinery of the machine, in the same manner as the cutters of a mower or reaper.

Figure 1:
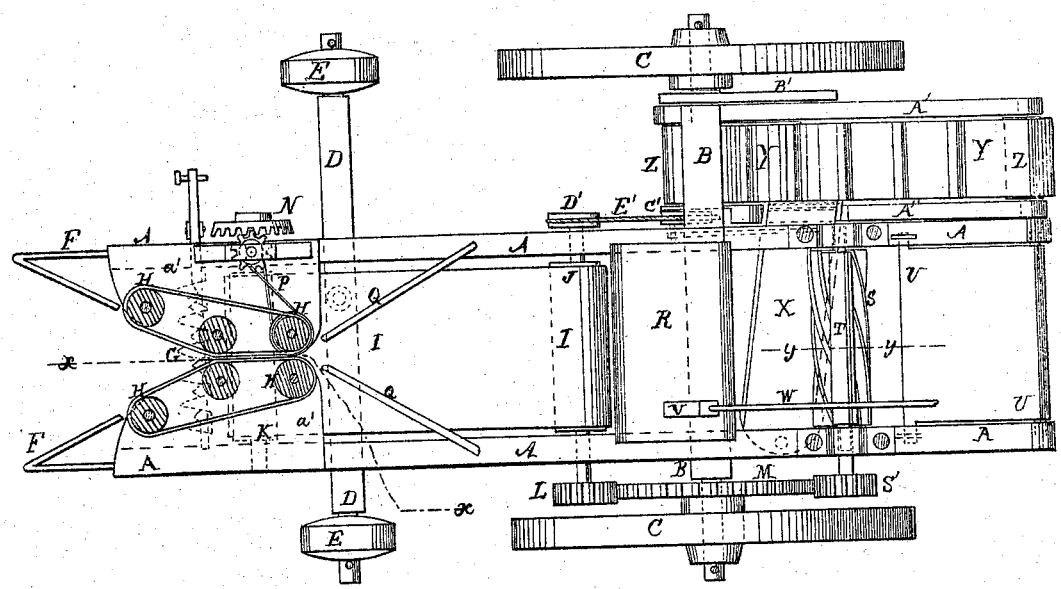
Figure 1 is a top or plan view of my improved corn-harvester.

H is the grasping-device, consisting of two rows of vertical rollers and two endless bands, one passing around each row of rollers, as shown in fig. 1. The forward pulley of each row is set back, as shown in fig. 1, to form a V-shaped entrance to the grasping-device.

The two rows of vertical rollers are set, one row upon each side of the longitudinal slot formed in the forward platform a' of the frame A, the forward end of said slot being made V-shaped, as shown in fig. 1.

As the stalks are cut off they are carried back in an erect position by the grasping-device H, until their buts come in contact with the endless apron I, moving rearward, by which the said buts are carried rearward in advance of the tops, so that when released from the grasping-device H, they may fall upon and be carried back by the said endless apron, with their buts toward the rear end of the machine.

The endless apron I, which may be made either with or without cross-slats, passes around the rollers J and K, the journals of which work in bearings in the frame A.

To the projecting end of one of the journals of the rear roller J, is attached a gear-wheel, L, the teeth of which mesh into the teeth of the large gear-wheel M, attached to the wheel C, or to the inner part of the hub of said wheel, so that the endless apron I, may be operated by the advance of the machine.

To the projecting end of one of the journals of the forward roller K is attached a bevel gear-wheel, N, the teeth of which mesh into the teeth of the bevel gear-wheel O, pivoted to the frame A, and which is so formed as to serve as a pulley to receive the band P, which passes around a pulley formed upon or attached to one of the rollers of the grasping-device H, so that the said device may be operated by the advance of the machine.

The gearing that operates the endless apron I, and the grasping-device H, should be so arranged that the said endless apron may have a faster movement than the said grasping-device, so as to carry the buts of the stalks in advance of their tops, to cause the said stalks to fall upon the said endless apron with their buts toward the rear end of the machine. To compel the stalks to take this position, a guiding-device, Q, should be attached to the frame A, and so formed as to guide the stalks into proper position upon the endless arm I.

Figure 3:
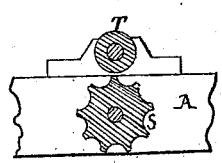
Figure 3 is a detail sectional view taken through the line y–y, fig. 1.

R is a narrow stationary platform, attached to the middle part of the frame A, across which the stalks pass from the endless apron I to the rollers S T, which are pivoted to the frame A, one directly above the other, and at such a distance apart that the stalks may pass between them, but not the ears. The lower or larger roller S, is grooved or corrugated spirally, as shown in figs. 1 and 3, but the upper and smaller roller T, is made smooth.

Figure 2:
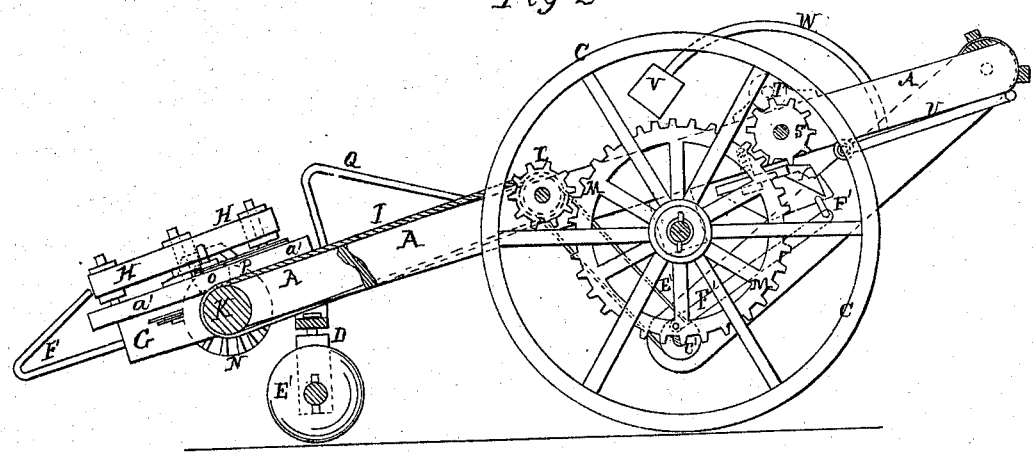
Figure 2 is a side view of the same, partly in section, through the line x–x, fig. 1.

The rollers S T are driven by means of a gear-wheel, S', attached to the journal of the roller S, and the teeth of which mesh into the teeth of the gear-wheel M, as shown in figs. 1 and 2.

As the stalks pass from the rollers S T, they drop upon the platform U, which is pivoted at its forward edge to the frame A, and which is held in a horizontal position by the weight V, attached to the forward end of the bent arm W, the rear end of which is attached to the said platform U. The weight of the weight V must depend upon the desired size of the bundles or bunches of stalks to be formed, so that when the desired quantity of stalks has been received upon the platform U, the weight V will be overbalanced, and the stalks be allowed to fall upon the ground, the weight V at once bringing the said platform into a horizontal position, ready to receive another bundle of stalks.

As the ears are broken from the stalks, they drop into the spout or hopper X, suspended in an inclined position beneath the frame A, so as to receive the said ears and convey them to the carrier.

The carrier is an endless chain of buckets, Y, passing around rollers Z, pivoted to the upper and lower ends of the inclined frame A', the upper part of which is attached to the frame A, and the lower part of which is connected with and supported from the axle B or frame A, by means of a bar or bars, B'.

To the projecting journal of the inner end of the lower roller Z, is attached a pulley, C', around which, and around the pulley D', attached to the journal of the roller J, passes a belt, E', so that the said carrier may be operated by the advance of the machine. If desired, the pulleys C', D', and belt E', may be replaced by a system of gear-wheels producing the same effect.

To the pulley C' is attached a crank-pin, to which is pivoted one end of the pitman F', the other end of which is pivoted to the hopper or spout X, so that, as the machine is drawn forward, the said spout or hopper may be agitated to facilitate the passage of the ears to the carrier, by which they are carried up and allowed to drop into some suitable receptacle prepared to receive them.

Having thus described my invention,

What I claim as new, and desire to secure by Letters Patent, is—

1. The stalk-grasping device H, constructed and operating in connection with the lifters F, slotted platform a', cutters G, and endless apron I, substantially as herein shown and described, and for the purpose set forth.

2. The combination of the endless apron I with the grasping-device H, rollers J K, frame A, and rollers S T, substantially as herein shown and described, and for the purpose set forth.

3. The combination of the guides Q or equivalent with the endless apron I, frame A, and grasping-device H, substantially as herein shown and described, and for the purpose set forth.

4. The combination of the rollers S T with the frame A, endless apron I, and hopper or spout X, substantially as herein shown and described, and for the purpose set forth.

5. The spout or hopper X, operated from the carrier by means of a crank and pitman, in combination with the rollers S T, frame A, and carrier Y Z A', substantially as herein shown and described, and for the purpose set forth.

The above specification of my invention signed by me, this 3d day of April, 1869.

JOHN McLEISH.

Witnesses:
FRANK BLOCKLEY,
JAMES T. GRAHAM.